UNITED STATES PATENT OFFICE.

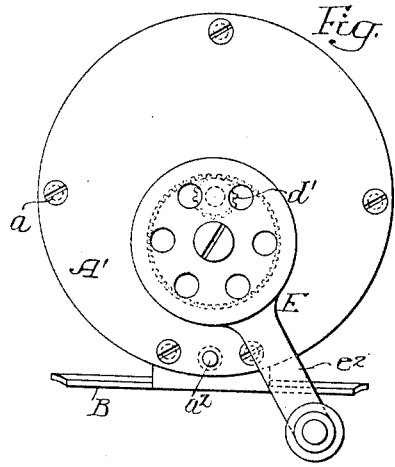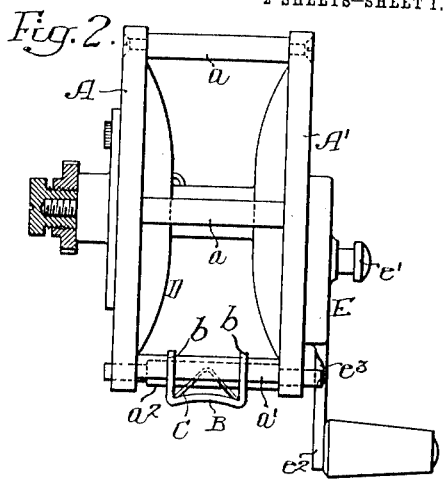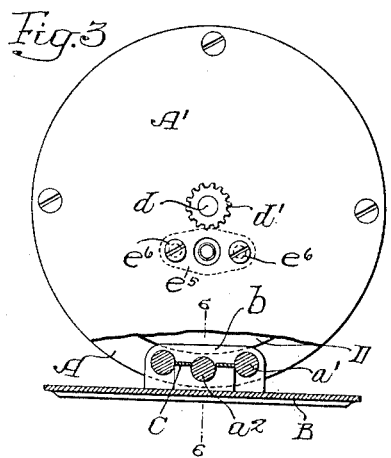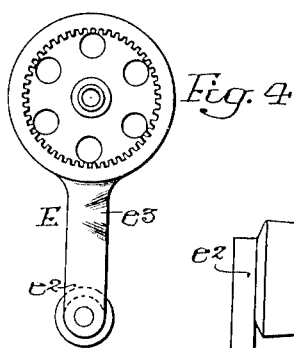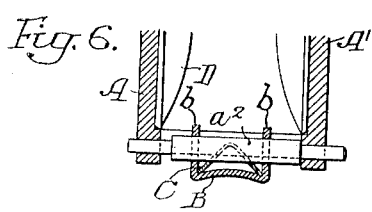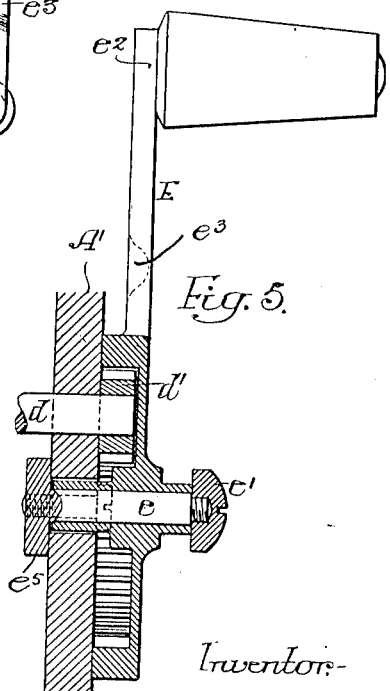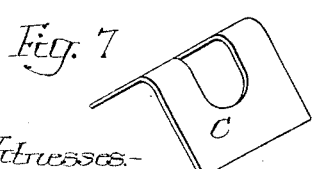

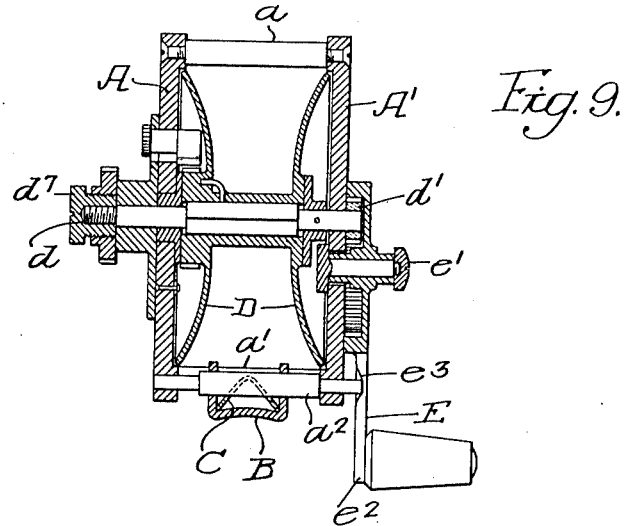
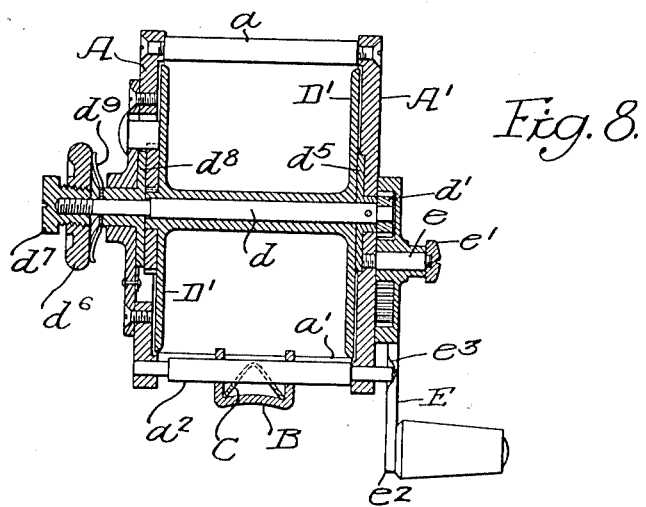

LEONARD ATWOOD, OF BOSTON, MASSACHUSETTS, ASSIGNOR OF ONE-HALF TO CHARLES F. POPE, OF NEW YORK, N. Y.

FISHING-REEL.

1,073,728.  Specification of Letters Patent.  Patented Sept. 23, 1913.

Application filed April 30, 1909. Serial No. 493,209.

*To all whom it may concern:*

Be it known that I, LEONARD ATWOOD, a citizen of the United States, residing in Boston, Massachusetts, have invented certain Improvements in Fishing-Reels, of which the following is a specification.

One object of my invention is to provide means whereby the handle may be locked from revolution in one direction while being free to turn in the other, said means being provided with an attachment whereby its operation is prevented except when desired. The construction is also so designed as to be simple and substantial, it being desired to provide improved means for varying the retarding force applied to the spool as well as a reliable and efficient device for exerting such force.

I further desire to provide a fishing reel with a locking device capable of being automatically released by the act of winding line upon the reel.

These objects and other advantageous ends I secure as hereinafter set forth, reference being had to the accompanying drawings, in which:—

Figures 1 and 2 are, respectively, a side and an end elevation partly in section of a reel constructed according to my invention; Fig. 3, is a side elevation of the reel with the crank handle removed; Fig. 4, is a side elevation of the crank handle; Fig. 5, is a vertical section illustrating the detail construction of the crank handle and its associated parts; Fig. 6, is a vertical section on the line 6—6 of Fig. 3 illustrating the detail construction of the locking mechanism for the crank handle; Fig. 7, is a perspective view of the friction holding device for the locking pin, and Fig. 8 is a vertical section of a slightly modified form of my invention; Fig. 9 is a vertical section of the fishing reel shown in Fig. 2.

In the above drawings A and A' represent two disks, usually of hard rubber or metal, forming the side plates of the reel and rigidly connected by suitable transversely extending bars $a$ and $a'$.

The bars $a'$ carry a cylindrically curved plate B constituting a rod engaging structure designed to fit the curved surface of the butt of the rod, and it will be noted that there is mounted in suitable bearings in the side plates a longitudinally movable pin $a^2$ placed between the two bars $a'$ and extending loosely through the lugs $b$ whereby the curved plate B is held to said bars. This pin $a^2$, when in one position, projects for a definite distance beyond the surface of one of the side plates as A' as well as beyond the surface of the other plate and in order to prevent its moving too freely, I mount between it and the upper surface of the curved plate B a V-shaped brake or friction-exerting piece C having a small notch, preferably at the center of its apex line, for the reception of said pin. The V-shaped piece is preferably though not necessarily of spring material and in any case is so constructed and arranged as to at all times bear upon the pin $a^2$ and resist to a definite extent its longitudinal movement.

The reel spool D may be connected to the spindle proper $d$ in any desired way, the parts being preferably arranged and constructed as shown in Fig. 5, so that said spindle projects beyond the outside face of the side plate A', where it has fastened to it a pinion $d'$. A spindle $e$ is fixed to the side plate A', being formed in this case integral with a plate $e^5$ held to the side plate by screws $e^6$, so as to project parallel with the reel spindle $d$ and serves for the reception and support of the crank handle E which is held to it by a nut $e'$ screwed on said spindle. This crank handle has its central or hub portion formed in the shape of an internally toothed gear, and its proportions are such that when mounted upon the spindle $e$, its teeth engage the teeth of the pinion $d'$. It will be noted that the handle itself, indicated at $e^2$, is of a relatively great length, since there is nothing to impede its movement, and from Fig. 4, it will be seen that there is in one edge of the inner side of this handle a notch $e^3$ decreasing in depth as it departs from said edge, and so placed as to receive the end of the locking pin $a^2$ when this is in its projecting position, and force it to move longitudinally out of the way.

As is obvious from Fig. 8, whose construction in this regard is the same as that of Fig. 2, the spindle $d$ may be attached to or released from the reel spool D', or it may be connected thereto so as to permit the independent movement of said spool to be retarded to any desired extent. For this purpose I fix to the spindle $d$ a flanged collar $d^5$ mounted between one of the side portions of the spool D' and the side plate A'. The opposite end of the spindle $d$ is threaded and provided with a tension regulating nut $d^6$; the threads of the spindle being right handed for the well known form of geared reel and left handed for the reel shown or for a single acting reel. This threaded end does not carry the nut directly, but has mounted on it a sleeve $d^7$ upon the outside surface of which are formed right hand threads when the present construction is employed. The nut $d^6$, with similar threads, is then mounted upon this sleeve. A second flanged collar $d^8$ is carried on the spindle $d$ between the second side member of the reel spool and the side plate A in such manner as to be free to move longitudinally of said spindle while being compelled to turn therewith.

The click and brake mechanism (which form no part of this invention) may be mounted in any desired manner, and in addition I preferably place a spring $d^9$ between the nut $d^6$ and adjacent the end of the flanged collar $d^8$. As shown in Fig. 2, this spring may be omitted if desired.

As a consequence of this construction the reel spool may be completely released from any operative connection with the spindle $d$ and hence with the crank spindle, by turning the nut $d^6$ in a direction such that it moves away from the end of the collar $d^8$, or if said nut is set up in an opposite direction, the reel spindle may be coupled to the spool so that they necessarily move together or so that if the handle E be held, the movement of the spool will be retarded to any desired extent. By the peculiar arrangement of left and right hand threads on the spindle, the sleeve $d^7$ and the nut $d^6$, any likelihood of these parts becoming loosened or lost is obviated. Moreover with the particular gearing employed the spindle of the reel is turned in the same direction as the crank, so that it is permissible to lead the fishing line from that side of said reel immediately adjacent to the rod, thereby obviating the strain which is ordinarily exerted upon the first line guide of the pole and on the reel seat, whenever a multiplying reel is used. Moreover, owing to the use of an internally toothed gear formed as part of the crank, it is possible to bring the center of the crank spindle $e$ relatively near the center line of the reel spindle $d$, so that in spite of the fact that the device provides a multiplying gear, it is possible to materially elongate the crank handle without causing it to project beyond the sides of the reel to an undue extent.

The locking pin $a^2$ projects beyond the side of the reel opposite that adjacent the crank handle $e^2$ and by projecting it into the path of movement of said handle this latter may be prevented from rotating so as to pay out the fishing line, although owing to the formation of the slot $e^3$, the revolution of the crank handle in the direction to wind up the line causes the locking pin to be engaged by the cam surface formed by the notch $e^3$ and moved longitudinally out of the way of said handle. While said pin is free to move as noted, the V-shaped brake or friction producing device formed by the piece C effectually holds it from moving under the influence of gravity or even under the action of a sharp blow or shock.

So far as the locking pin is concerned, it is immaterial where upon the crank handle the cam surface, which in this instance is formed by the notch $e^3$, is placed or whether the reel be of the single acting or multiplying type, it being only necessary that said pin prevents turning of the crank handle in one direction and is so acted on by the cam surface as to be moved out of its locking position when the handle is turned in the opposite direction.

I claim:—

1. The combination in a reel of a frame having a spool; a crank handle for turning the same; with a longitudinally movable locking pin mounted in bearings in the frame so as to be slidable in a line substantially parallel to the axis of the spool and capable of being projected at will into the path of the crank handle; with an automatic friction exerting device acting on said pin and tending to hold it in any given position.

2. The combination in a reel of a frame having a spool; a crank handle for turning the same; with a longitudinally movable locking pin mounted to slide in bearings in the frame so as to be adjustable transversely thereof and capable of being projected into the path of the crank handle; said handle having a cam surface placed to longitudinally move said pin when the handle is turned in one direction.

3. The combination in a reel, of a frame having a spool; a crank handle operatively connected to said spool for turning the same; a longitudinally movable locking pin mounted in the frame so as to be adjustable transversely thereof and capable of being projected into the path of the crank handle; with means for applying friction to said pin to prevent its free movement; the reel mechanism including means for moving the pin to an inactive position when the handle is turned in a predetermined direction.

4. The combination in a reel of a frame, including two side plates; a spool; a crank handle for turning said spool; means for operatively connecting the crank handle and spool; a rod engaging structure connected to the frame; a locking pin supported to be longitudinally movable in a line parallel to the axis of the spool and capable of being projected into the path of the crank handle; with a friction producing piece mounted between said pin and said rod engaging structure.

5. The combination in a fishing reel of a frame, a spool, a spindle having an operating handle and threaded at one end, with means for operatively connecting said spool and spindle at will, said means including a sleeve threaded on the threaded end of the spindle, and an adjustable nut threaded on said sleeve, the threads between the nut and the sleeve running in a direction opposite those between the sleeve and the spindle.

In testimony whereof, I have signed my name to this specification, in the presence of two subscribing witnesses.

LEONARD ATWOOD.

Witnesses:
WILLIAM E. BRADLEY,
WM. A. BARR.

Copies of this patent may be obtained for five cents each, by addressing the "Commissioner of Patents, Washington, D. C."